(12) United States Patent
Clark et al.

(10) Patent No.: US 12,404,811 B1
(45) Date of Patent: Sep. 2, 2025

(54) AIRCRAFT POWERPLANT GEARBOX WITH SELECTABLE POWER COUPLER

(71) Applicant: RTX Corporation, Farmington, CT (US)

(72) Inventors: Thomas E. Clark, Wells, ME (US); Murat Yazici, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/977,606

(22) Filed: Dec. 11, 2024

(51) Int. Cl.
  *F02C 7/32* (2006.01)
  *F02C 3/107* (2006.01)
  *F02C 7/36* (2006.01)

(52) U.S. Cl.
  CPC ............ *F02C 7/32* (2013.01); *F02C 3/107* (2013.01); *F02C 7/36* (2013.01)

(58) Field of Classification Search
  CPC .... F02C 7/32; F02C 7/36; F02C 3/107; F01D 5/06; F01D 15/10; F01D 15/12; B64D 35/00; F16H 3/30; F05D 2260/4023; F05D 2260/4031
  See application file for complete search history.

(56) References Cited

U.S. PATENT DOCUMENTS

| | | | |
|---|---|---|---|
| 7,246,482 B2 * | 7/2007 | Mahoney | F02C 7/32 60/39.183 |
| 7,481,062 B2 | 1/2009 | Gaines | |
| 10,422,243 B2 | 9/2019 | Suciu | |
| 10,563,591 B2 | 2/2020 | Muldoon | |
| 11,248,523 B2 * | 2/2022 | Leque | F02C 7/32 |
| 11,333,077 B2 | 5/2022 | Foutch | |
| 11,591,967 B2 | 2/2023 | Foutch | |
| 2006/0272313 A1 * | 12/2006 | Eick | F02C 7/275 60/39.63 |
| 2009/0314002 A1 * | 12/2009 | Libera | F02C 7/277 60/778 |
| 2018/0283274 A1 * | 10/2018 | Jackowski | F02C 7/36 |
| 2018/0291818 A1 * | 10/2018 | Suciu | F02C 7/32 |
| 2020/0116085 A1 * | 4/2020 | Polly | F02C 7/36 |
| 2020/0355122 A1 * | 11/2020 | Foutch | B64D 35/02 |
| 2021/0131347 A1 * | 5/2021 | Leque | F16H 37/022 |
| 2021/0207544 A1 * | 7/2021 | Muldoon | F02C 7/36 |

(Continued)

*Primary Examiner* — William H Rodriguez
(74) *Attorney, Agent, or Firm* — Getz Balich LLC

(57) ABSTRACT

An aircraft powerplant assembly includes a gearbox and a power coupler. The gearbox includes a first power transfer apparatus and a second power transfer apparatus independent of the first power transfer apparatus. The power coupler includes a clutch. The first power transfer apparatus is configured to operatively couple and transfer mechanical power through the gearbox between a first engine apparatus and an engine accessory. The power coupler is configured to operatively couple a power coupled accessory to the second power transfer apparatus when the clutch is engaged. The second power transfer apparatus and the power coupler are collectively configured to operatively couple and transfer mechanical power through the gearbox between a second engine apparatus and the power coupled accessory when the clutch is engaged. The power coupler is configured to operatively decouple the second power transfer apparatus from the power coupled accessory when the clutch is disengaged.

20 Claims, 5 Drawing Sheets

(56) References Cited

U.S. PATENT DOCUMENTS

| | | | | |
|---|---|---|---|---|
| 2021/0388733 A1* | 12/2021 | Valois | ................... | F01D 15/10 |
| 2023/0374944 A1* | 11/2023 | Hanrahan | ................ | F02C 7/36 |
| 2024/0328364 A1* | 10/2024 | Labrecque | ................ | F02C 7/36 |

* cited by examiner

AIRCRAFT POWERPLANT GEARBOX WITH SELECTABLE POWER COUPLER

BACKGROUND OF THE DISCLOSURE

1. Technical Field

This disclosure relates generally to an aircraft powerplant and, more particularly, to an accessory system for the aircraft powerplant.

2. Background Information

An aircraft powerplant such as a turbofan engine includes an accessory system. This accessory system may include various accessories such as fluid pumps, electric motors, electric generators, and the like coupled to an accessory gearbox. Various types and configurations of accessory systems are known in the art. While these known accessory systems have various benefits, there is still room in the art for improvement.

SUMMARY OF THE DISCLOSURE

According to an aspect of the present disclosure, an assembly is provided for an aircraft powerplant. This assembly includes a gearbox and a power coupler. The gearbox includes a first power transfer apparatus and a second power transfer apparatus independent of the first power transfer apparatus. The power coupler is mounted to an exterior of the gearbox and includes a clutch. The first power transfer apparatus is configured to operatively couple and transfer mechanical power through the gearbox between a first engine apparatus and an engine accessory. The power coupler is configured to operatively couple a power coupled accessory to the second power transfer apparatus when the clutch is engaged. The second power transfer apparatus and the power coupler are collectively configured to operatively couple and transfer mechanical power through the gearbox between a second engine apparatus and the power coupled accessory when the clutch is engaged. The power coupler is configured to operatively decouple the second power transfer apparatus from the power coupled accessory when the clutch is disengaged.

According to another aspect of the present disclosure, another assembly is provided for an aircraft powerplant. This assembly includes a first rotating structure, a second rotating structure, an engine accessory, a power coupled accessory, a gearbox and a power coupler. The first rotating structure includes a first bladed engine rotor. The second rotating structure includes a second bladed engine rotor. The gearbox includes a first power transfer apparatus and a second power transfer apparatus that is mechanically disengaged from the first power transfer apparatus. The power coupler is between the power coupled accessory and the gearbox. The first power transfer apparatus is configured to operatively couple and transfer mechanical power through the gearbox between the first rotating structure and the engine accessory. During a first operating mode, the power coupler is configured to operatively couple the power coupled accessory to the second power transfer apparatus, and the second power transfer apparatus and the power coupler are collectively configured to operatively couple and transfer mechanical power through the gearbox between the second rotating structure and the power coupled accessory. During a second operating mode, the power coupler is configured to operatively decouple the second power transfer apparatus from the power coupled accessory.

According to still another aspect of the present disclosure, another assembly is provided for an aircraft powerplant. This assembly includes a first rotating structure, a second rotating structure, an engine accessory, a power coupled accessory, a gearbox and a power coupler. The first rotating structure includes a first bladed engine rotor. The second rotating structure includes a second bladed engine rotor. The gearbox includes a first power transfer apparatus and a second power transfer apparatus that is mechanically disengaged from the first power transfer apparatus. The power coupler is arranged with the gearbox. The gearbox is disposed between the power coupled accessory and the power coupler. The first power transfer apparatus is configured to operatively couple and transfer mechanical power through the gearbox between the first rotating structure and the engine accessory. During a first operating mode, the power coupler is configured to operatively couple the power coupled accessory to the second power transfer apparatus, and the second power transfer apparatus and the power coupler are collectively configured to operatively couple and transfer mechanical power through the gearbox between the second rotating structure and the power coupled accessory. During a second operating mode, the power coupler is configured to operatively decouple the second power transfer apparatus from the power coupled accessory.

The power coupler may include a clutch configured to: engage during the first operating mode; and disengage during the second operating mode.

The power coupler may be mounted to an exterior of the gearbox. The power coupled accessory may be mounted to an exterior of the power coupler.

The power coupler may be integrated with the power coupled accessory into a module that is removably coupled to an exterior of the gearbox.

The power coupler may be configured to engage the clutch when a rotational speed of the second engine apparatus is equal to or less than a threshold. The power coupler may be configured to disengage the clutch when the rotational speed of the second engine apparatus is greater than the threshold.

The power coupler may also include a gear system configured to transfer mechanical power between the power coupled accessory and the second power transfer apparatus when the clutch is engaged.

The assembly may also include the power coupled accessory mounted to the gearbox through the power coupler.

The assembly may also include the power coupled accessory mounted to the exterior of the gearbox independent of the power coupler.

The power coupler may be mounted to a first side of the gearbox. The power coupled accessory may be mounted to a second side of the gearbox opposite the first side of the gearbox.

The gearbox may also include a third power transfer apparatus independent of the first power transfer apparatus and the second power transfer apparatus. The third power transfer apparatus may be configured to operatively couple and transfer mechanical power through the gearbox between the power coupler and the power coupled accessory.

The third power transfer apparatus may be configured as a pass-through shaft extending through the gearbox.

The assembly may also include the power coupled accessory and a housing mounted to the exterior of the gearbox. The power coupler and the power coupled accessory may be housed within the housing.

The assembly may also include the power coupled accessory. The power coupler and the power coupled accessory may be configured together in a single line replaceable unit that is removably mounted to the gearbox.

The assembly may also include the power coupled accessory. The power coupled accessory may include an electric machine.

The assembly may also include the power coupled accessory. The power coupled accessory may be configurable as at least one of an electric motor or an electric generator.

The second power transfer apparatus may be configured to operatively couple and transfer mechanical power through the gearbox between the second engine apparatus and a third engine accessory independent of the power coupler.

The gearbox may also include a gearbox housing. The second power transfer apparatus may be configured as or otherwise include a gear system disposed in the gearbox housing.

The gearbox may also include a gearbox housing. The first power transfer apparatus may be configured as or otherwise include a first gear system disposed in the gearbox housing. The second power transfer apparatus may be configured as or otherwise include a second gear system disposed in the gearbox housing.

The assembly may also include a compressor section, a combustor section, a first turbine section, a second turbine section and a flowpath extending through the compressor section, the combustor section, the first turbine section and the second turbine section from an inlet into the flowpath to an exhaust from the flowpath. The first engine apparatus may include a first turbine rotor disposed in the first turbine section. The second engine apparatus may include a second turbine rotor disposed in the second turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
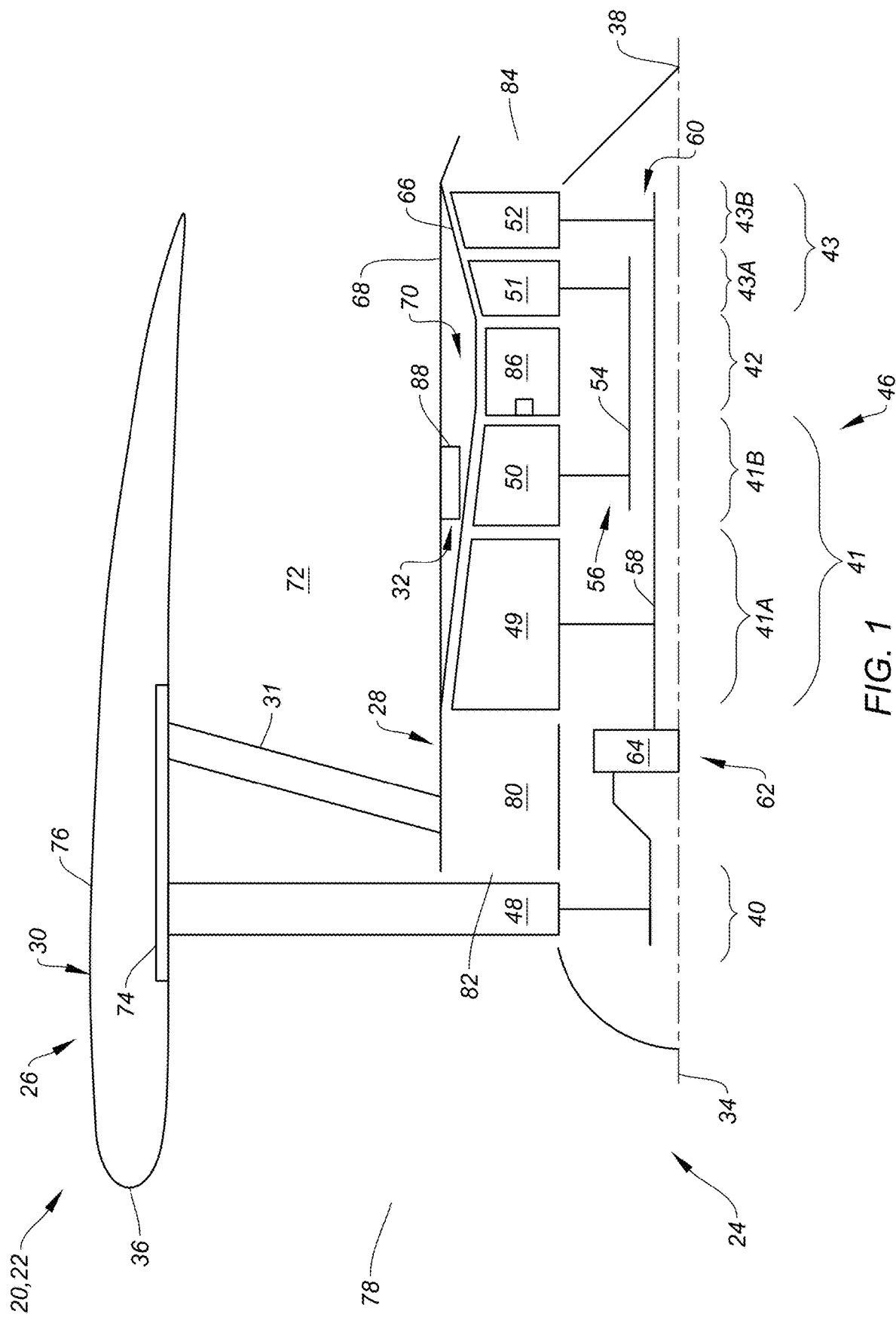
FIG. 1 is a partial schematic sectional illustration of an aircraft propulsion system.

FIG. 1 illustrates a powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may alternatively (or also) be configured as an electrical power system for the aircraft; e.g., an auxiliary power unit (APU).

The aircraft propulsion system 22 includes a gas turbine engine 24 (e.g., a turbofan engine) housed within a stationary engine housing 26, which engine housing 26 of FIG. 1 includes an inner housing structure 28, an outer housing structure 30 and a vane structure 31 (e.g., a fan exit guide vane (FEGV) structure) extending radially between and connected to the inner housing structure 28 and the outer housing structure 30. The aircraft propulsion system 22 also includes an accessory system 32 servicing one or more components and/or sub-systems of the aircraft propulsion system 22 and its turbine engine 24. The aircraft propulsion system 22 extends axially along an axis 34 between an axial forward, upstream end 36 of the aircraft propulsion system 22 and an axial aft, downstream end 38 of the aircraft propulsion system 22. Briefly, the powerplant axis 34 may be a centerline axis of the aircraft propulsion system 22, the turbine engine 24 and/or one or more of its members. The powerplant axis 34 may also or alternatively be a rotational axis for one or more members of the turbine engine 24.

The aircraft propulsion system 22 and its turbine engine 24 of FIG. 1 includes a propulsor section 40 (e.g., a fan section), a compressor section 41, a combustor section 42 and a turbine section 43. The compressor section 41 of FIG. 1 includes a low pressure compressor (LPC) section 41A and a high pressure compressor (HPC) section 41B. The turbine section 43 of FIG. 1 includes a high pressure turbine (HPT) section 43A and a low pressure turbine (LPT) section 43B. Here, at least (or only) the LPC section 41A, the HPC section 41B, the combustor section 42, the HPT section 43A and the LPT section 43B collectively form a core 46 of the turbine engine 24.

The engine sections 40-43B may be arranged sequentially along the powerplant axis 34 within the engine housing 26. The propulsor section 40 includes a bladed propulsor rotor 48; e.g., a fan rotor. The LPC section 41A includes a bladed low pressure compressor (LPC) rotor 49. The HPC section 41B includes a bladed high pressure compressor (HPC) rotor 50. The HPT section 43A includes a bladed high pressure turbine (HPT) rotor 51. The LPT section 43B includes a bladed low pressure turbine (LPT) rotor 52. The propulsor rotor 48, the LPC rotor 49, the HPC rotor 50, the HPT rotor 51 and the LPT rotor 52 each include a rotor base (e.g., a disk or a hub) and a plurality of rotor blades (e.g., airfoils, rotor vanes, etc.). The rotor blades are arranged and may be equispaced circumferentially around the respective rotor base in one or more arrays. With this arrangement, the rotor blades may be arranged into one or more stages. Each of the rotor blades is connected to (e.g., formed integral with or otherwise attached to) the respective rotor base. Each of the rotor blades projects radially (e.g., spanwise) out from the respective rotor base to a distal tip of the respective rotor blade.

The HPC rotor 50 is coupled to and rotatable with the HPT rotor 51. The HPC rotor 50 of FIG. 1, for example, is connected to the HPT rotor 51 through a high speed shaft 54. At least (or only) the HPC rotor 50, the HPT rotor 51 and the high speed shaft 54 collectively form a high speed rotating structure 56; e.g., a high speed spool of the engine core 46. This high speed rotating structure 56 of FIG. 1 and its members 50, 51 and 54 are rotatable about the powerplant axis 34. However, it is contemplated the high speed rotating structure 56 may alternatively be rotatable about another axis radially and/or angularly offset from the rotational axis of the propulsor rotor 48 and/or the centerline axis of the turbine engine 24.

The LPC rotor 49 is coupled to and rotatable with the LPT rotor 52. The LPC rotor 49 of FIG. 1, for example, is connected to the LPT rotor 52 through a low speed shaft 58. At least (or only) the LPC rotor 49, the LPT rotor 52 and the low speed shaft 58 collectively form a low speed rotating structure 60; e.g., a low speed spool of the engine core 46. This low speed rotating structure 60 is further coupled to the propulsor rotor 48 through a drivetrain 62. The drivetrain 62 may be configured as a geared drivetrain, where a geartrain 64 (e.g., a transmission, a speed change device, an epicyclic geartrain, etc.) is disposed between and operatively couples the propulsor rotor 48 to the low speed rotating structure 60 and its LPT rotor 52. With this arrangement, the propulsor rotor 48 may rotate at a different (e.g., slower) rotational speed than the low speed rotating structure 60 and its LPT rotor 52. Alternatively, the drivetrain 62 may be configured as a direct-drive drivetrain, where the geartrain 64 is omitted. With such an arrangement, the propulsor rotor 48 rotates at a common (the same) rotational speed as the low speed rotating structure 60 and its LPT rotor 52. The low speed rotating structure 60 of FIG. 1 and its members 49, 52 and 58 as well as the propulsor rotor 48 are rotatable about the powerplant axis 34. However, it is contemplated the low speed rotating structure 60 may alternatively be rotatable about another axis radially and/or angularly offset from the rotational axis of the propulsor rotor 48 and/or the centerline axis of the turbine engine 24.

The inner housing structure 28 of FIG. 1 includes an inner case 66 (e.g., a core case) for the turbine engine 24, an inner nacelle structure 68 (sometimes referred to as an inner fixed structure (IFS)) and an internal inner housing compartment 70. The inner case 66 is disposed radially outboard of, extends axially along and may circumscribe one or more or all of the engine sections 41A-43B and their respective bladed engine rotors 49-52. The inner case 66 may thereby house and provide a support structure for the respective bladed engine sections 41A-43B and their respective engine rotors 49-52. The inner nacelle structure 68 is configured to provide an aerodynamic cover over the engine core 46 and its inner case 66. The inner housing compartment 70 of FIG. 1 is formed by and is disposed radially between the inner case 66 and an inner barrel of the inner nacelle structure 68. The inner housing structure 28 and its inner nacelle structure 68 may also form a radial inner peripheral boundary of a bypass flowpath 72 (e.g., an annular bypass flowpath) within the aircraft propulsion system 22.

The outer housing structure 30 of FIG. 1 includes an outer case 74 (e.g., a fan case) for the turbine engine 24 and an outer nacelle structure 76. The outer case 74 is disposed radially outboard of, extends axially along and may circumscribe the propulsor section 40 and its propulsor rotor 48. The outer case 74 may thereby house and provide a containment structure for the propulsor section 40 and its propulsor rotor 48. The outer nacelle structure 76 is configured to provide an aerodynamic cover over the outer case 74. The outer housing structure 30 and its outer nacelle structure 76 may also form a radial outer peripheral boundary of the bypass flowpath 72.

During operation, ambient air from outside of the aircraft enters the aircraft propulsion system 22 and its turbine engine 24 through an airflow inlet 78. This air is directed across the propulsor section 40 and into a core flowpath 80 (e.g., annular core flowpath) and the bypass flowpath 72. The core flowpath 80 of FIG. 1 extends sequentially through the LPC section 41A, the HPC section 41B, the combustor section 42, the HPT section 43A and the LPT section 43B from an airflow inlet 82 into the core flowpath 80 to a combustion products exhaust 84 out from the core flowpath 80 and the engine core 46. The air entering the core flowpath 80 may be referred to as "core air". The bypass flowpath 72 extends through a bypass duct, which bypass flowpath 72 and bypass duct bypass (e.g., are disposed radially outboard of and extend along) the engine core 46 and the inner housing structure 28. The air within the bypass flowpath 72 may be referred to as "bypass air".

The core air is compressed by the LPC rotor 49 and the HPC rotor 50 and is directed into a combustion chamber 86 (e.g., an annular combustion chamber) of a combustor (e.g., an annular combustor) in the combustor section 42. Fuel is injected into the combustion chamber 86 by one or more fuel injectors and mixed with the compressed core air to provide a fuel-air mixture. This fuel-air mixture is ignited and combustion products thereof flow through and sequentially drive rotation of the HPT rotor 51 and the LPT rotor 52 about the powerplant axis 34. The rotation of the HPT rotor 51 and the LPT rotor 52 respectively drive rotation of the HPC rotor 50 and the LPC rotor 49 about the powerplant axis 34 and, thus, compression of the air received from the core inlet 82. The rotation of the LPT rotor 52 also drives rotation of the propulsor rotor 48. The rotation of the propulsor rotor 48 propels the bypass air through and out of the bypass flowpath 72. The propulsion of the bypass air may account for a majority of thrust generated by the turbine engine 24 of FIG. 1. Briefly, within the bypass flowpath 72, the vane structure 31 conditions (e.g., straightens out, deswirls, etc.) the flow of bypass air propelled by the propulsor rotor 48 to enhance the forward thrust.

While the turbine engine 24 is described above with a particular two rotating structure arrangement, the present disclosure is not limited thereto. For example, the LPC rotor 49 may be omitted to configure the LPT rotor 52 as a power turbine (PT) rotor for the propulsor rotor 48. In another example, the turbine engine 24 may also include another rotating structure; e.g., an intermediate speed spool for the engine core 46.

Figure 2:
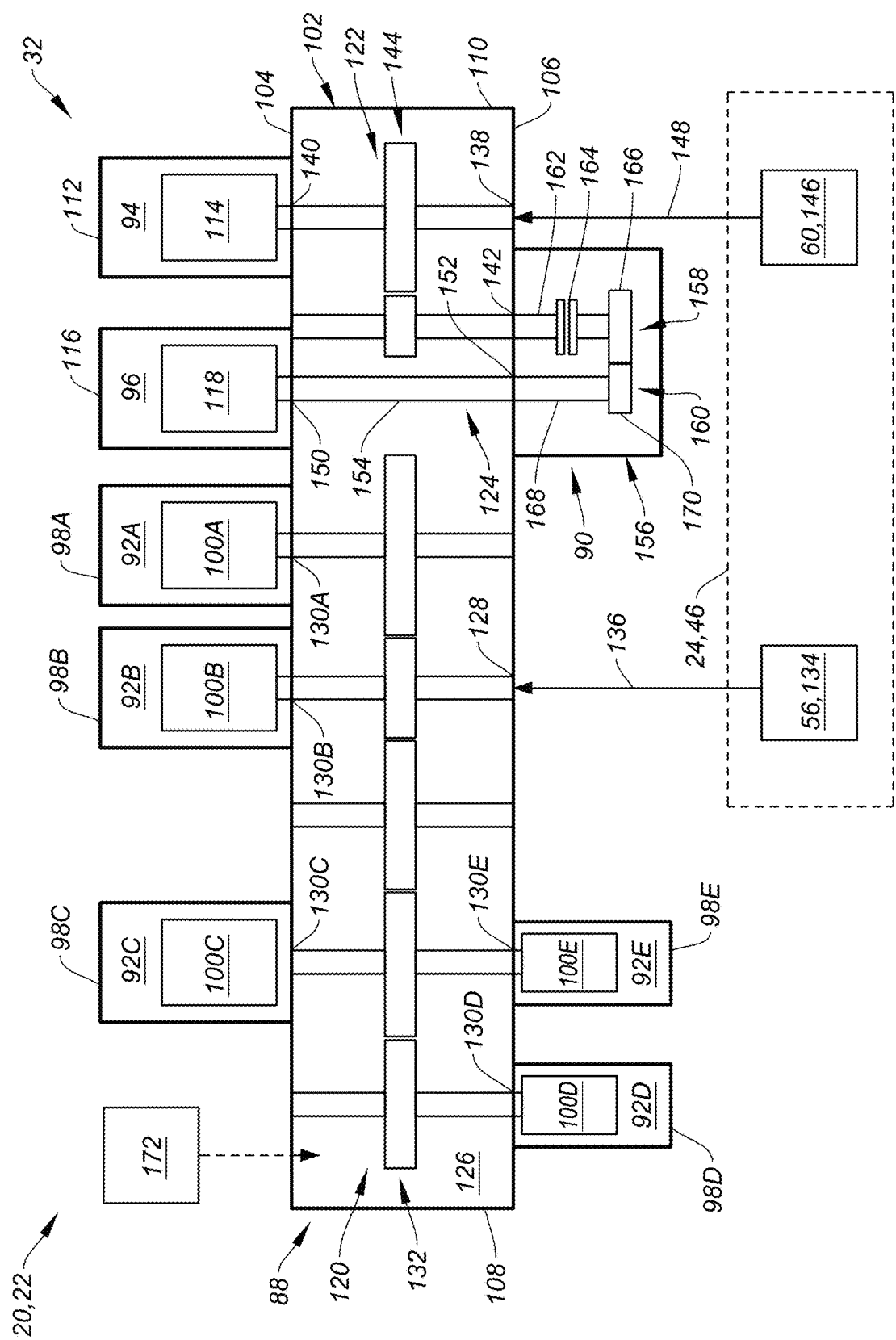
FIG. 2 is a schematic illustration of a portion of the aircraft propulsion system at an accessory system.

Referring to FIG. 2, the accessory system 32 includes a set of one or more gearbox mounted engine accessories, an accessory gearbox 88 and a power coupler 90 for the accessory gearbox 88. The gearbox mounted engine accessories of FIG. 2 includes one or more first engine accessories 92A-E (generally referred to as "92"), a second engine accessory 94 and a third engine accessory 96. The present disclosure, however, is not limited to such an exemplary gearbox mounted engine accessory arrangement. For example, the accessory system 32 may be configured with multiple second engine accessories 94 and/or multiple third engine accessories 96. Moreover, it is contemplated the accessory system 32 may alternatively be configured without the first engine accessories 92 and/or the second engine accessory 94.

Each of the first engine accessories 92A-E includes a first engine accessory housing 98A-E (generally referred to as "98") (e.g., a case) and a first engine accessory rotor 100A-E (generally referred to as "100") at least partially housed within the respective first engine accessory housing 98. Each first engine accessory 92 is mounted to or otherwise arranged with the accessory gearbox 88, for example external to the accessory gearbox 88. The first engine accessory housing 98 of each first engine accessory 92, for example, may be mechanically fastened and/or otherwise attached to an exterior of a housing 102 (e.g., a case) of the accessory gearbox 88. Briefly, the gearbox housing 102 of FIG. 2 extends axially along the powerplant axis 34 (see FIG. 1) between opposing axial sides 104 and 106 of the accessory gearbox 88 and its gearbox housing 102. The gearbox housing 102 of FIG. 2 also extends laterally (e.g., circumferentially about the powerplant axis 34 and/or tangentially to a reference circle extending around the powerplant axis 34) between opposing lateral ends 108 and 110 of the accessory gearbox 88 and its gearbox housing 102. The first engine accessories 92A-C may be disposed at (e.g., on, adjacent or proximate) the gearbox first side 104. The first engine accessories 92A-C of FIG. 2, for example, are arranged laterally along the gearbox first side 104 between the gearbox first end 108 and the third engine accessory 96. The first engine accessories 92D and 92E may be disposed at the gearbox second side 106. The first engine accessories 92D and 92E of FIG. 2, for example, are arranged laterally along the gearbox first side 104 between the gearbox first end 108 and the power coupler 90. The present disclosure, however, is not limited to such an exemplary arrangement. All of the first engine accessories 92, for example, may be disposed to the gearbox first side 104 or the gearbox second side 106.

The second engine accessory 94 includes a second engine accessory housing 112 (e.g., a case) and a second engine accessory rotor 114 at least partially housed within the second engine accessory housing 112. The second engine accessory 94 is mounted to or otherwise arranged with the accessory gearbox 88, for example external to the accessory gearbox 88. The second engine accessory housing 112, for example, may be mechanically fastened and/or otherwise attached to the gearbox housing 102. The second engine accessory 94 may be disposed at the gearbox first side 104. The second engine accessory 94 of FIG. 2, for example, is arranged laterally along the gearbox first side 104 between the gearbox second end 110 and the third engine accessory 96. The present disclosure, however, is not limited to such an exemplary arrangement. For example, the second engine accessory 94 may alternatively be arranged laterally along the gearbox second side 106 between the gearbox second end 110 and the power coupler 90.

The third engine accessory 96 includes a third engine accessory housing 116 (e.g., a case) and a third engine accessory rotor 118 at least partially housed within the third engine accessory housing 116. The third engine accessory 96 is mounted to or otherwise arranged with the accessory gearbox 88, for example external to the accessory gearbox 88. The third engine accessory housing 116, for example, may be mechanically fastened and/or otherwise attached to the gearbox housing 102. The third engine accessory 96 may be disposed at the gearbox first side 104. The third engine accessory 96 of FIG. 2, for example, is arranged laterally along the gearbox first side 104 between the first engine accessories 98A-C and the second engine accessory 94. Here, the third engine accessory 96 is laterally aligned with and axially opposite the power coupler 90.

Examples of the engine accessories 92, 94, 96 include, but are not limited to, fluid pump(s), fluid conditioner(s) and/or electric machine(s). Examples of the fluid pumps include, but are not limited to, fuel pump(s), hydraulic pump(s) and/or lubricant pump(s). Examples of the fluid conditioners include, but are not limited to, de-oiler(s) and/or separator(s). Examples of the electric machines include, but are not limited to, variable frequency generator(s), integral drive generator(s), permanent magnet motor-generator(s) and/or permanent magnet motor(s).

The accessory gearbox 88 includes the gearbox housing 102, a first engine power transfer apparatus 120, a second engine power transfer apparatus 122 and an accessory power transfer apparatus 124. Each of the power transfer apparatuses 120, 122, 124 is partially or completely housed within the accessory gearbox 88 and its gearbox housing 102. The power transfer apparatuses 120, 122 and 124 of FIG. 2, for example, may be partially or completely located within a common (e.g., the same) internal gearbox compartment 126 of the gearbox housing 102. Alternatively, the gearbox compartment 126 may be sub-divided into one or more (e.g., fluidly coupled) sub-compartments within the gearbox housing 102 by one or more baffles. Still alternatively, the gearbox housing 102 may include multiple internal gearbox compartments, where at least one of the power transfer systems 120, 122, 124 may be partially or completely located within a separate one of the gearbox compartments than another one of the power transfer systems 120, 122, 124.

The first engine power transfer apparatus 120 is operatively independent of the other power transfer apparatuses 122 and 124 within the accessory gearbox 88 and its gearbox housing 102. The first engine power transfer apparatus 120 may also be operatively independent of the other power transfer apparatuses 122 and 124 outside the accessory gearbox 88 and its gearbox housing 102. The first engine power transfer apparatus 120 of FIG. 2, for example, is spatially separated from and mechanically decoupled from the other power transfer apparatuses 122 and 124 both within and outside of the accessory gearbox 88 and its gearbox housing 102.

The first engine power transfer apparatus 120 of FIG. 2 includes a first engine coupling 128, one or more first engine accessory couplings 130A-E (generally referred to as "130") and a first gearbox gear system 132. The first engine coupling 128 is operatively coupled to a first engine apparatus 134 (e.g., an engine rotating structure, an engine rotor, etc.) through, for example, a first drivetrain 136. This first drivetrain 136 may be configured as or otherwise include a shaft, a tower shaft assembly, another gearbox (e.g., an angle gearbox), and/or the like. For ease of description, the first engine apparatus 134 may be described below as the high speed rotating structure 56. However, in other embodiments, it is contemplated the first engine apparatus 134 may alternatively be the low speed rotating structure 60 or another rotating structure or rotor within the turbine engine 24. Each first engine accessory coupling 130 of FIG. 2 is operatively coupled to the first engine accessory rotor 100 of a respective one of the first engine accessories 92. The first gearbox gear system 132 is (e.g., completely) housed within the accessory gearbox 88. This first gearbox gear system 132 is operatively coupled between and operatively interconnects the various first engine power transfer apparatus couplings 128 and 130.

The second engine power transfer apparatus 122 is operatively independent of the other power transfer apparatuses 120 and 124 within the accessory gearbox 88 and its gearbox housing 102. The second engine power transfer apparatus 122 may also be operatively independent of the first engine power transfer apparatus 120 outside the accessory gearbox 88 and its gearbox housing 102. The second engine power transfer apparatus 122 of FIG. 2, for example, is spatially separated from and mechanically decoupled from the other power transfer apparatuses 120 and 124 within of the accessory gearbox 88 and its gearbox housing 102. The second engine power transfer apparatus 122 of FIG. 2 is also spatially separated from and mechanically decoupled from the first engine power transfer apparatus 120 outside of the accessory gearbox 88 and its gearbox housing 102.

The second engine power transfer apparatus 122 of FIG. 2 includes a second engine coupling 138, a second engine accessory coupling 140, a first power coupler coupling 142 and a second gearbox gear system 144. The second engine coupling 138 is operatively coupled to a second engine apparatus 146 (e.g., an engine rotating structure, an engine rotor, etc.) through, for example, a second drivetrain 148. This second drivetrain 148 may be configured as or otherwise include a shaft, a tower shaft assembly, another gearbox (e.g., an angle gearbox), and/or the like. For case of description, the second engine apparatus 146 may be described below as the low speed rotating structure 60. However, in other embodiments, it is contemplated the second engine apparatus 146 may alternatively be the high speed rotating structure 56 or another rotating structure or rotor within the turbine engine 24. The second engine accessory coupling 140 of FIG. 2 is operatively coupled to the second engine accessory rotor 114. The second gearbox gear system 144 is (e.g., completely) housed within the accessory gearbox 88. This second gearbox gear system 144 is operatively coupled between and operatively interconnects the various second engine power transfer apparatus couplings 138, 140 and 142.

The accessory power transfer apparatus 124 is operatively independent of the engine power transfer apparatuses 120 and 122 within the accessory gearbox 88 and its gearbox housing 102. The accessory power transfer apparatus 124 of FIG. 2, for example, is spatially separated from and mechanically decoupled from the engine power transfer apparatuses 120 and 122 within the accessory gearbox 88 and its gearbox housing 102. The accessory power transfer apparatus 124 may also be operatively independent of the first engine power transfer apparatus 120 outside the accessory gearbox 88 and its gearbox housing 102. By contrast, the accessory power transfer apparatus 124 of FIG. 2 is selectively operatively coupled to the second engine power transfer apparatus 122 outside of the accessory gearbox 88 through the power coupler 90 as described below.

The accessory power transfer apparatus 124 of FIG. 2 includes a third engine accessory coupling 150, a second power coupler coupling 152 and a pass-through shaft 154. The third engine accessory coupling 150 of FIG. 2 is operatively coupled to the third engine accessory rotor 118. The pass-through shaft 154 is operatively coupled between and operatively interconnects the accessory power transfer apparatus couplings 150 and 152. The third engine accessory coupling 150 of FIG. 2, for example, is connected to (or integrated as part of) the pass-through shaft 154 at a first end of the pass-through shaft 154. The second power coupler coupling 152 of FIG. 2 is connected to (or integrated as part of) the pass-through shaft 154 at a second end of the pass-through shaft 154, where the second end of the pass-through shaft 154 is opposite the first end of the pass-through shaft 154. Here, the pass-through shaft 154 passes axially through the accessory gearbox 88 and its gearbox housing 102. This pass-through shaft 154 is also arranged laterally between the first gearbox gear system 132 and the second gearbox gear system 144 within the accessory gearbox 88 and its gearbox housing 102.

The power coupler 90 of FIG. 2 includes a coupler housing 156 (e.g., a case), a first coupler assembly 158 and a second coupler assembly 160, where each coupler assembly 158, 160 is at least partially or completely housed within the coupler housing 156. The power coupler 90 is removably mounted to or otherwise arranged with the accessory gearbox 88. The coupler housing 156, for example, may be mechanically fastened and/or otherwise attached to the gearbox housing 102. The power coupler 90 may be disposed at the gearbox second side 106. The power coupler 90 of FIG. 2, for example, is arranged laterally along the gearbox second side 106 between the fifth engine accessory 92E and the gearbox second end 110. Here, the power coupler 90 is laterally aligned with and axially opposite the third engine accessory 96. The power coupler 90 may also laterally overlap one or more of the power transfer apparatuses 120 and/or 122.

The first coupler assembly 158 includes a first coupler shaft 162, a first coupler clutch 164 and a first coupler gear 166. The first coupler shaft 162 is operatively coupled to the second engine power transfer apparatus 122. More particularly, the first coupler shaft 162 of FIG. 2 is connected to and rotatable with the first power coupler coupling 142. The first coupler clutch 164 is between the first coupler shaft 162 and the first coupler gear 166. This first coupler clutch 164 is configured to selectively (a) mechanically connect the first coupler shaft 162 to the first coupler gear 166 such that the first coupler shaft 162 is rotatable with the first coupler gear 166, or (b) mechanically disconnect the first coupler shaft 162 from the first coupler gear 166 such that the first coupler shaft 162 is rotatably independent from the first coupler gear 166 and vice versa.

The second coupler assembly 160 includes a second coupler shaft 168 and a second coupler gear 170. The second coupler shaft 168 is operatively coupled to the accessory power transfer apparatus 124. More particularly, the second coupler shaft 168 of FIG. 2 is connected to and rotatable with the second power coupler coupling 152. The second coupler gear 170 is connected to (e.g., mounted on) and rotatable with the second coupler shaft 168. The second coupler gear 170 is meshed with the first coupler gear 166.

During aircraft powerplant operation, the power coupler 90 is configured to facilitate a selective operational coupling of the second engine apparatus 146 and the third engine accessory rotor 118. For example, during a first mode of operation, the power coupler 90 of FIG. 2 may operatively couple and transfer mechanical power between the accessory power transfer apparatus 124 and the second engine power transfer apparatus 122. Here, the power coupler 90 and the gearbox members 122 and 124 are collectively configured to operatively couple and transfer the mechanical power between the second engine apparatus 146 and the third engine accessory rotor 118. During a second mode of operation, the power coupler 90 of FIG. 2 may operatively decouple the accessory power transfer apparatus 124 from the second engine power transfer apparatus 122. Here, the second engine apparatus 146 is operatively decoupled from the third engine accessory rotor 118.

During the first operating mode, the first coupler clutch 164 is engaged. By engaging the first coupler clutch 164, the first coupler assembly 158 and the second coupler assembly 160 operatively couple the third engine accessory rotor 118 to the second engine power transfer apparatus 122. The second engine power transfer apparatus elements 138, 140 and 142 may thereby rotate with the third engine accessory rotor 118. Therefore, during this first operating mode, the third engine accessory rotor 118 may be rotationally driven by the second engine apparatus 146 (e.g., the low speed rotating structure 60) or the second engine accessory rotor 114. Alternatively, the third engine accessory rotor 118 may drive rotation of (or mechanically boost power to) the second engine apparatus 146 (e.g., the low speed rotating structure 60) and/or the second engine accessory rotor 114.

During the second operating mode, the first coupler clutch 164 is disengaged. The second engine power transfer apparatus elements 138, 140 and 142 may rotate independent of the third engine accessory rotor 118, and vice versa. Here, the third engine accessory 96 is operationally isolated from the operation of the engine core 46 (see FIG. 1).

In some embodiments, the mode of operation may be selected based on a rotational speed of the second engine apparatus 146; e.g., the low speed rotating structure 60. For example, when the second engine apparatus 146 is rotating at or below a threshold speed, the power coupler 90 may operate in the first operating mode. However, when the second engine apparatus 146 is rotating above the threshold speed, the power coupler 90 may operate in the second operating mode. With such operation, the power coupler 90 may operate in the second operating mode during higher power phases of aircraft flight such as aircraft takeoff, aircraft climb and aircraft cruise. By contrast, the power coupler 90 may operate in the first operating mode during lower power phases of aircraft flight such as aircraft descent, aircraft landing, aircraft taxiing and during startup of the aircraft powerplant 20 while on ground. The present disclosure, of course, is not limited to the foregoing exemplary power coupler schedule.

In some embodiments, the power coupler 90 may be configured as a self-contained module. With such an arrangement, the power coupler 90 may have an internal lubrication system which is independent from a lubrication system 172 for the accessory gearbox 88. Possible contaminants generated by wear of the first coupler clutch 164 may thereby be kept out of the accessory gearbox 88, as well as other systems fluidly coupled to the accessory gearbox 88. In addition, by independently mounting the power coupler 90 to the accessory gearbox 88, the power coupler 90 may be removed from the accessory gearbox 88 as a single line replaceable unit (LRU) without requiring removal and/or disconnecting of aircraft powerplant components such as other engine accessories; e.g., 92, 94 and/or 96.

Figure 3:
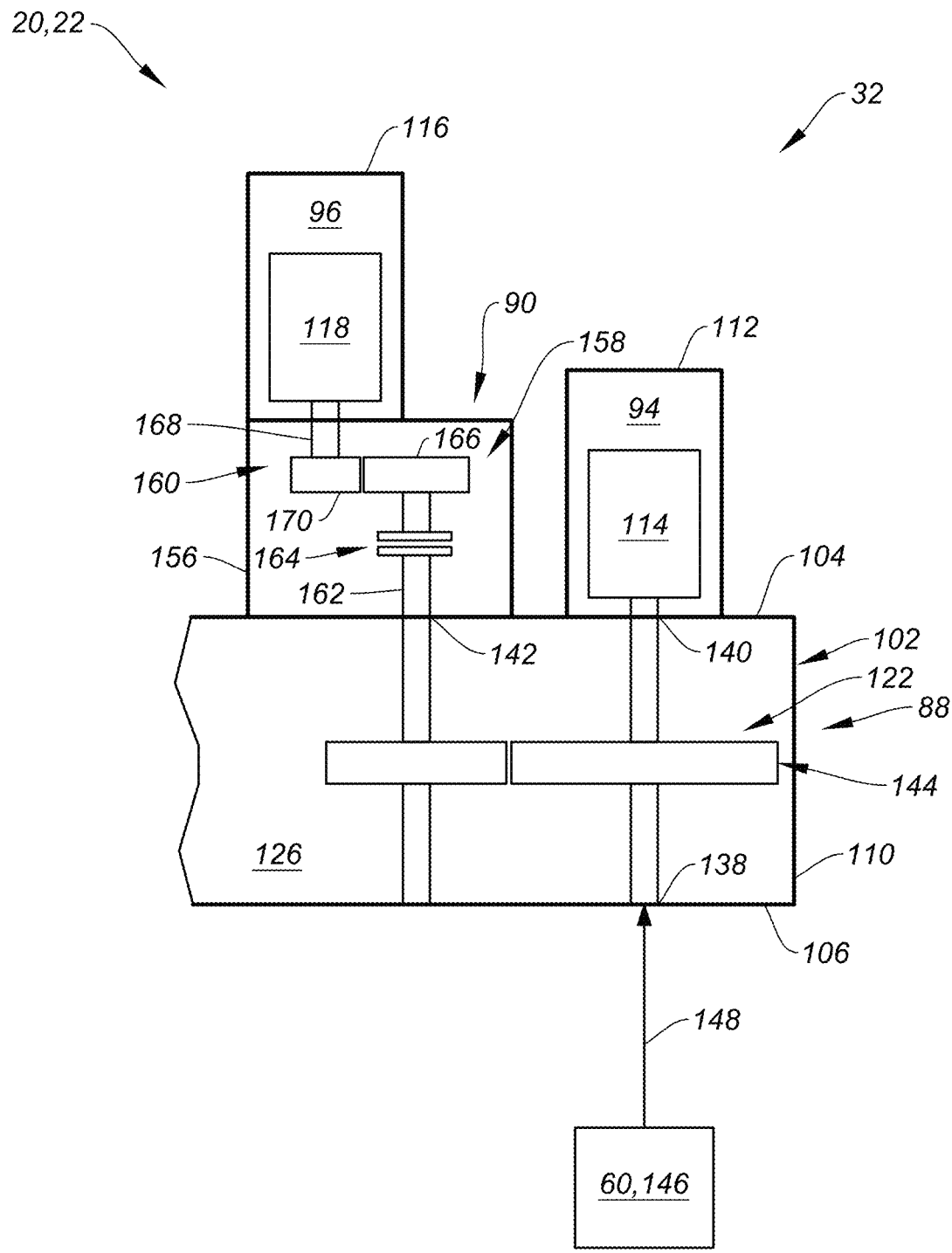
FIGS. 3 and 4 are schematic illustrations of a portion of the aircraft propulsion system at the accessory system with various alternative power coupler arrangements.
Figure 4:
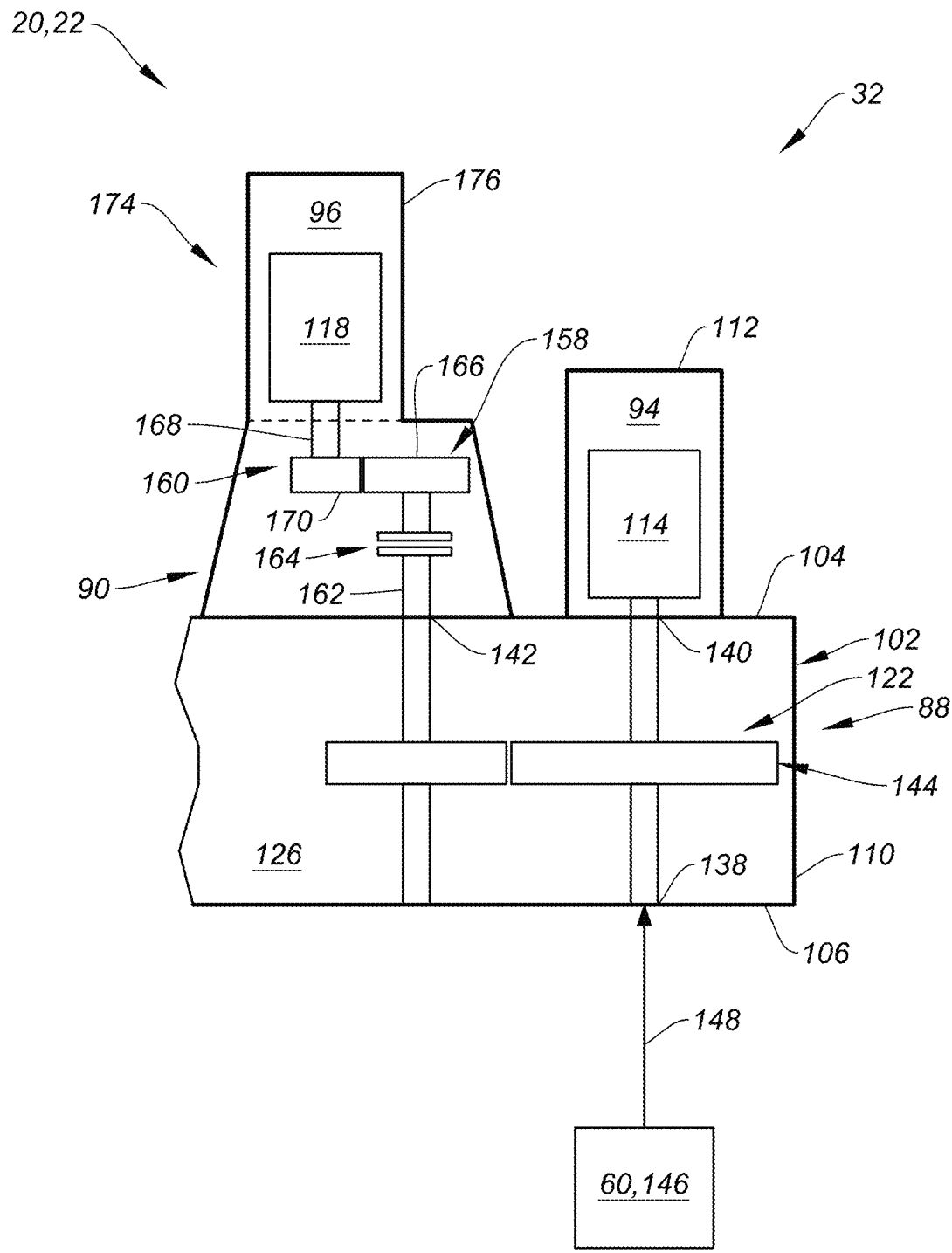

In some embodiments, referring to FIG. 2, the power coupler 90 and the third engine accessory 96 may be located to the opposing axial sides 106 and 104 of the accessory gearbox 88 and its gearbox housing 102, respectively. With this arrangement, the power coupler 90 and the third engine accessory 96 may each be removably attached (e.g., mechanically fastened) to the exterior of the accessory gearbox 88 and its gearbox housing 102. Moreover, the accessory gearbox 88 and its gearbox housing 102 (e.g., axially) physically separate the power coupler 90 from the third engine accessory 96. In other embodiments, referring to FIGS. 3 and 4, the power coupler 90 and the third engine accessory 96 may be located to a common one of the axial sides 104, 106 of the accessory gearbox 88 and its gearbox housing 102; e.g., the gearbox first side 104. For example, the power coupler 90 of FIG. 3 is removably attached to the exterior of the accessory gearbox 88 at its gearbox first side 104. The third engine accessory 96 is removably attached to an exterior of the power coupler 90 and its coupler housing 156. With this arrangement, the third engine accessory 96 is indirectly mounted to the accessory gearbox 88 through the power coupler 90. In another example, the power coupler 90 of FIG. 4 is integrated with the third engine accessory 96 into a module 174; e.g., a single line-replaceable unit (LRU). More particularly, the power coupler members 158 and 160 and the third engine accessory rotor 118 of FIG. 4 are arranged within a common housing 176 (e.g., a case) for the power coupler-accessory module 174.

In some embodiments, referring to FIG. 2, the power coupler 90 may be indirectly coupled to the third engine accessory 96 through the accessory power transfer apparatus 124. In other embodiments, referring to FIGS. 3 and 4, the power coupler 90 may be directly coupled to the third engine accessory 96, and the accessory power transfer apparatus 124 of FIG. 2 may be omitted. The second coupler shaft 168 of FIGS. 3 and 4, for example, is (e.g., directly) connected to and rotatable with the third engine accessory rotor 118. However, in other embodiments, it is contemplated one or more additional coupling elements may be provided between the second coupler shaft 168 and the third engine accessory rotor 118. However, the additional coupling element(s) may be arranged outside of the accessory gearbox 88; e.g., part of the power coupler 90, the third engine accessory 96 and/or the power coupler-accessory module 174.

The power coupler 90 is generally described above with (a) the second engine power transfer apparatus 122 coupled to the power coupler 90 through the first coupler assembly 158 and (b) the third engine accessory rotor 118 coupled to the power coupler 90 through the second coupler assembly 160. The present disclosure, however, is not limited to such an exemplary arrangement. For example, (a) the second engine power transfer apparatus 122 may alternatively be coupled to the power coupler 90 through the second coupler assembly 160 and (b) the third engine accessory rotor 118 may alternatively be coupled to the power coupler 90 through the first coupler assembly 158.

Figure 5:
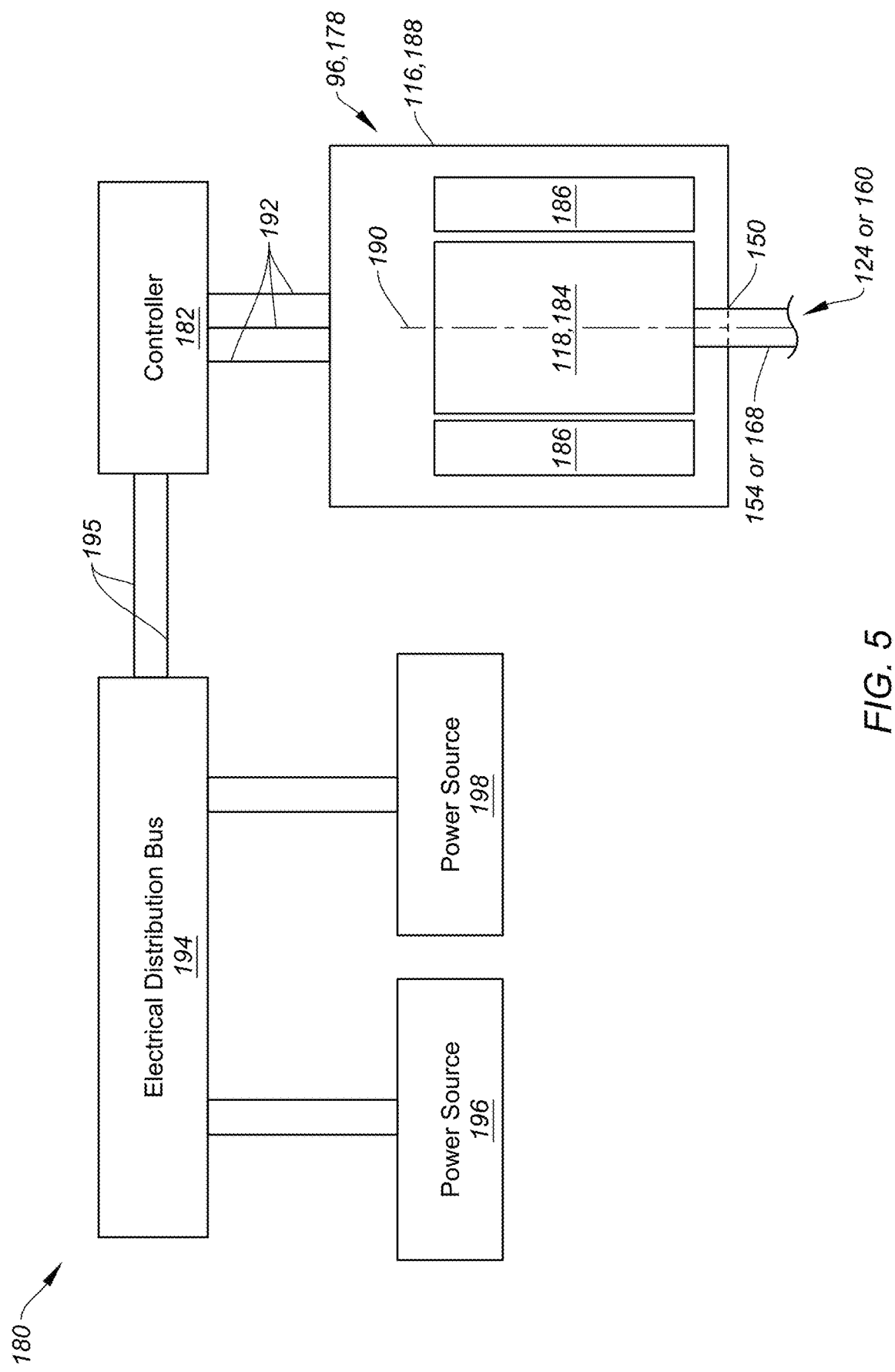
FIG. 5 is a schematic illustration of a portion of the aircraft propulsion system with an electric machine electrically coupled to an electrical system.

In some embodiments, referring to FIG. 5, the third engine accessory 96 may be configured as an electric machine 178 that is electrically coupled to an electrical system 180 through an electric machine (EM) controller 182. The electric machine 178 of FIG. 5 includes an electric machine rotor 184 (here, the third engine accessory rotor 118), an electric machine stator 186 and an electric machine housing 188 (here, the third engine accessory housing 116). The machine rotor 184 is rotatable about a rotational axis 190 of the machine rotor 184, which rotational axis 190 may also be an axial centerline of the electric machine 178 and coaxial with a rotational axis of the second coupler assembly 160 and/or the accessory power transfer apparatus 124 (see FIG. 2). The machine stator 186 of FIG. 5 is radially outboard of and circumscribes the machine rotor 184. With this arrangement, each electric machine 178 is configured as a radial flux electric machine. The electric machine 178 of the present disclosure, however, is not limited to such an exemplary rotor-stator configuration nor to radial flux arrangements. The machine rotor 184, for example, may alternatively be radially outboard of and circumscribe the machine stator 186. In another example, the machine rotor 184 may be axially next to the machine stator 186 configuring the electric machine 178 as an axial flux electric machine. Referring again to FIG. 5, the machine rotor 184 and the machine stator 186 are at least partially or completely housed within and interior of the machine housing 188.

Each electric machine 178 of FIG. 5 may be configurable as an electric motor and/or an electric generator; e.g., an electric motor-generator. For example, during a motor mode of operation, the electric machine 178 may operate as the electric motor to convert electricity received from the aircraft electrical system 180. The machine stator 186, for example, may generate an electromagnetic field with the machine rotor 184 using a current of electricity received from the aircraft electrical system 180 through the EM controller 182. This electromagnetic field may drive rotation of the machine rotor 184. The machine rotor 184, in turn, may provide mechanical power to and drive rotation of the second engine apparatus 146 (see FIG. 2) and/or other elements through the power coupler 90. This mechanical power may be provided to boost power or completely power the rotation of the second engine apparatus 146 (see FIG. 2) and/or other elements. By contrast, during a generator mode of operation, the electric machine 178 may operate as the electric generator to convert mechanical power received from the second engine apparatus 146 (see FIG. 2) and/or other elements into electricity. Rotation of the machine rotor 184, for example, may be rotationally driven by rotation of the second engine apparatus 146 (see FIG. 2) and/or other elements through the power coupler 90. The rotation of the machine rotor 184 may generate an electromagnetic field with the machine stator 186, and the machine stator 186 may convert energy from the electromagnetic field into electricity. The electric machine 178 may then provide a current of electricity to the aircraft electrical system 180 through the EM controller 182 for storage and/or further use. The electric machine 178 of the present disclosure, however, is not limited to such exemplary operation. For example, the electric machine 178 may alternatively be configured as a dedicated electric generator; e.g., without the electric motor functionality. In another example, the electric machine 178 may be configured as a dedicated electric motor; e.g., without the electric generator functionality.

The EM controller 182 is electrically coupled to the electric machine 178 through one or more electric cables 192; e.g., high voltage electric cables, power feeder cables, etc. More particularly, controller circuitry in the EM controller 182 is electrically coupled to the electric machine 178 and its machine stator 186 through the electric cables 192. Similarly, the EM controller 182 is electrically coupled to an electrical distribution bus 194 of the aircraft electrical system 180 through one or more electric cables 195; e.g., high voltage electric cables, power feeder cables, etc. More particularly, the controller circuitry in the EM controller 182 is electrically coupled to the aircraft electrical system 180 and its electrical distribution bus 194 through the respective electric cables 195.

The EM controller 182 and its controller circuitry are configured to control operation of the electric machine 178. For example, when operating as the electric motor, the EM controller 182 is configured to regulate a flow of electricity from the aircraft electrical system 180 to the electric machine 178. This electricity flow regulation may include: (a) turning-on the flow of electricity from the aircraft electrical system 180 to the electric machine 178 (e.g., electrically coupling the electric machine 178 to the aircraft electrical system 180); (b) turning-off the flow of electricity from the aircraft electrical system 180 to the electric machine 178 (e.g., electrically decoupling the electric machine 178 from the aircraft electrical system 180); (c) moderating the flow of electricity from the aircraft electrical system 180 to the electric machine 178. Here, the EM controller 182 operates as a motor controller. In another example, when operating as the electric generator, the EM controller 182 is configured to regulate a flow of electricity from the electric machine 178 to the aircraft electrical system 180. This electricity flow regulation may include: (a) turning-on the flow of electricity from the electric machine 178 to the aircraft electrical system 180 (e.g., electrically coupling the electric machine 178 to the aircraft electrical system 180); (b) turning-off the flow of electricity from the electric machine 178 to the aircraft electrical system 180 (e.g., electrically decoupling the electric machine 178 from the aircraft electrical system 180); (c) moderating the flow of electricity from the electric machine 178 to the aircraft electrical system 180. Here, the EM controller 182 operates as a generator controller.

The aircraft electrical system 180 includes the electrical distribution bus 194. This aircraft electrical system 180 may also include a power source 196 and/or a power storage 198. The electrical distribution bus 194 is electrically coupled to the electric machine 178 through the EM controller 182. The electrical distribution bus 194 is also electrically coupled to the power source 196 and the power storage 198. With this arrangement, the electrical distribution bus 194 provides an intermediate connection between the various electrical aircraft propulsion system members 182, 196 and 198. The power source 196 may be an electric generator powered by the turbine engine 24 (see FIG. 1) or an electric generator powered by another aircraft powerplant; e.g., an engine of a companion aircraft propulsion system, an engine of an auxiliary power unit (APU), a fuel cell system, etc. The power storage 198 is configured to receive electricity from the electrical distribution bus 194 for storage. The power storage 198 is also configured to provide the stored electricity to the electrical distribution bus 194. The power storage 198, for example, may be configured as or otherwise include one or more electricity storage devices; e.g., batteries, super capacitors, etc.

Referring to FIG. 2, it is also contemplated one of the first engine accessories 92 (e.g., 92A) may be configured as a dedicated electric machine (e.g., an electric motor-generator, an electric motor or an electric generator) associated with the first engine apparatus 134. In addition or alternatively, it is contemplated the second engine accessory 94 may be configured as a dedicated electric machine (e.g., an electric motor-generator, an electric motor or an electric generator) associated with the second engine apparatus 146.

In some embodiments, referring to FIG. 1, the accessory gearbox 88 may be arranged in the inner housing compartment 70. The accessory gearbox 88, for example, may be mounted to the inner case 66. The present disclosure, however, is not limited to such an exemplary accessory gearbox location or mounting arrangement.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:
1. An assembly for an aircraft powerplant, comprising:
a gearbox including a first power transfer apparatus and a second power transfer apparatus independent of the first power transfer apparatus; and
a power coupler mounted to an exterior of the gearbox and comprising a clutch;
the first power transfer apparatus configured to operatively couple and transfer mechanical power through the gearbox between a first engine apparatus and an engine accessory;

the power coupler configured to operatively couple a power coupled accessory to the second power transfer apparatus when the clutch is engaged, and the second power transfer apparatus and the power coupler collectively configured to operatively couple and transfer mechanical power through the gearbox between a second engine apparatus and the power coupled accessory when the clutch is engaged; and the power coupler configured to operatively decouple the second power transfer apparatus from the power coupled accessory when the clutch is disengaged.

2. The assembly of claim 1, wherein
the power coupler is configured to engage the clutch when a rotational speed of the second engine apparatus is equal to or less than a threshold; and
the power coupler is configured to disengage the clutch when the rotational speed of the second engine apparatus is greater than the threshold.

3. The assembly of claim 1, wherein the power coupler further comprises a gear system configured to transfer mechanical power between the power coupled accessory and the second power transfer apparatus when the clutch is engaged.

4. The assembly of claim 1, further comprising the power coupled accessory mounted to the gearbox through the power coupler.

5. The assembly of claim 1, further comprising the power coupled accessory mounted to the exterior of the gearbox independent of the power coupler.

6. The assembly of claim 5, wherein
the power coupler is mounted to a first side of the gearbox; and
the power coupled accessory is mounted to a second side of the gearbox opposite the first side of the gearbox.

7. The assembly of claim 1, wherein
the gearbox further includes a third power transfer apparatus independent of the first power transfer apparatus and the second power transfer apparatus; and
the third power transfer apparatus is configured to operatively couple and transfer mechanical power through the gearbox between the power coupler and the power coupled accessory.

8. The assembly of claim 7, wherein the third power transfer apparatus is configured as a pass-through shaft extending through the gearbox.

9. The assembly of claim 1, further comprising:
the power coupled accessory; and
a housing mounted to the exterior of the gearbox;
the power coupler and the power coupled accessory housed within the housing.

10. The assembly of claim 1, further comprising:
the power coupled accessory;
the power coupler and the power coupled accessory configured together in a single line replaceable unit that is removably mounted to the gearbox.

11. The assembly of claim 1, further comprising the power coupled accessory, wherein the power coupled accessory comprises an electric machine.

12. The assembly of claim 1, wherein the second power transfer apparatus is configured to operatively couple and transfer mechanical power through the gearbox between the second engine apparatus and a third engine accessory independent of the power coupler.

13. The assembly of claim 1, wherein
the gearbox further includes a gearbox housing; and
the second power transfer apparatus comprises a gear system disposed in the gearbox housing.

14. The assembly of claim 1, wherein
the gearbox further includes a gearbox housing;
the first power transfer apparatus comprises a first gear system disposed in the gearbox housing; and
the second power transfer apparatus comprises a second gear system disposed in the gearbox housing.

15. The assembly of claim 1, further comprising:
a compressor section, a combustor section, a first turbine section, a second turbine section and a flowpath extending through the compressor section, the combustor section, the first turbine section and the second turbine section from an inlet into the flowpath to an exhaust from the flowpath;
the first engine apparatus comprising a first turbine rotor disposed in the first turbine section; and
the second engine apparatus comprising a second turbine rotor disposed in the second turbine section.

16. An assembly for an aircraft powerplant, comprising:
a first rotating structure comprising a first bladed engine rotor;
a second rotating structure comprising a second bladed engine rotor;
an engine accessory;
a power coupled accessory;
a gearbox including a first power transfer apparatus and a second power transfer apparatus that is mechanically disengaged from the first power transfer apparatus; and
a power coupler between the power coupled accessory and the gearbox;
the first power transfer apparatus configured to operatively couple and transfer mechanical power through the gearbox between the first rotating structure and the engine accessory;
during a first operating mode, the power coupler configured to operatively couple the power coupled accessory to the second power transfer apparatus, and the second power transfer apparatus and the power coupler collectively configured to operatively couple and transfer mechanical power through the gearbox between the second rotating structure and the power coupled accessory; and
during a second operating mode, the power coupler configured to operatively decouple the second power transfer apparatus from the power coupled accessory.

17. The assembly of claim 16, wherein the power coupler comprises a clutch configured to engage during the first operating mode; and
disengage during the second operating mode.

18. The assembly of claim 16, wherein
the power coupler is mounted to an exterior of the gearbox; and
the power coupled accessory is mounted to an exterior of the power coupler.

19. The assembly of claim 16, wherein the power coupler is integrated with the power coupled accessory into a module that is removably coupled to an exterior of the gearbox.

20. An assembly for an aircraft powerplant, comprising:
a first rotating structure comprising a first bladed engine rotor;
a second rotating structure comprising a second bladed engine rotor;
an engine accessory;
a power coupled accessory;
a gearbox including a first power transfer apparatus and a second power transfer apparatus that is mechanically disengaged from the first power transfer apparatus; and a power coupler arranged with the gearbox, wherein the gearbox is disposed between the power coupled accessory and the power coupler;

the first power transfer apparatus configured to operatively couple and transfer mechanical power through the gearbox between the first rotating structure and the engine accessory;

during a first operating mode, the power coupler configured to operatively couple the power coupled accessory to the second power transfer apparatus, and the second power transfer apparatus and the power coupler collectively configured to operatively couple and transfer mechanical power through the gearbox between the second rotating structure and the power coupled accessory; and during a second operating mode, the power coupler configured to operatively decouple the second power transfer apparatus from the power coupled accessory.

\* \* \* \* \*